Feb. 12, 1957  R. G. SCHMITT ET AL  2,780,832
MACHINE FOR MAKING SUPPOSITORIES OR THE LIKE
Filed Aug. 31, 1953  3 Sheets-Sheet 2
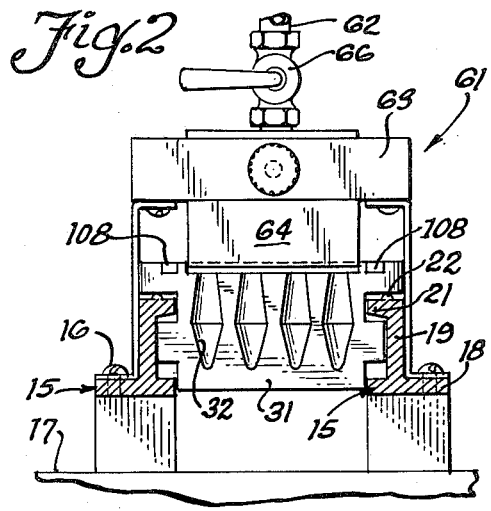
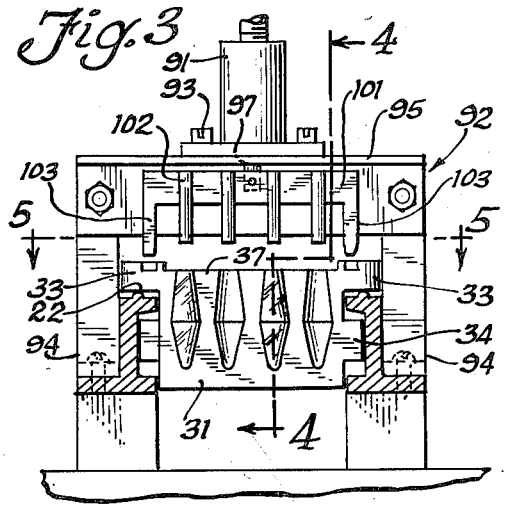
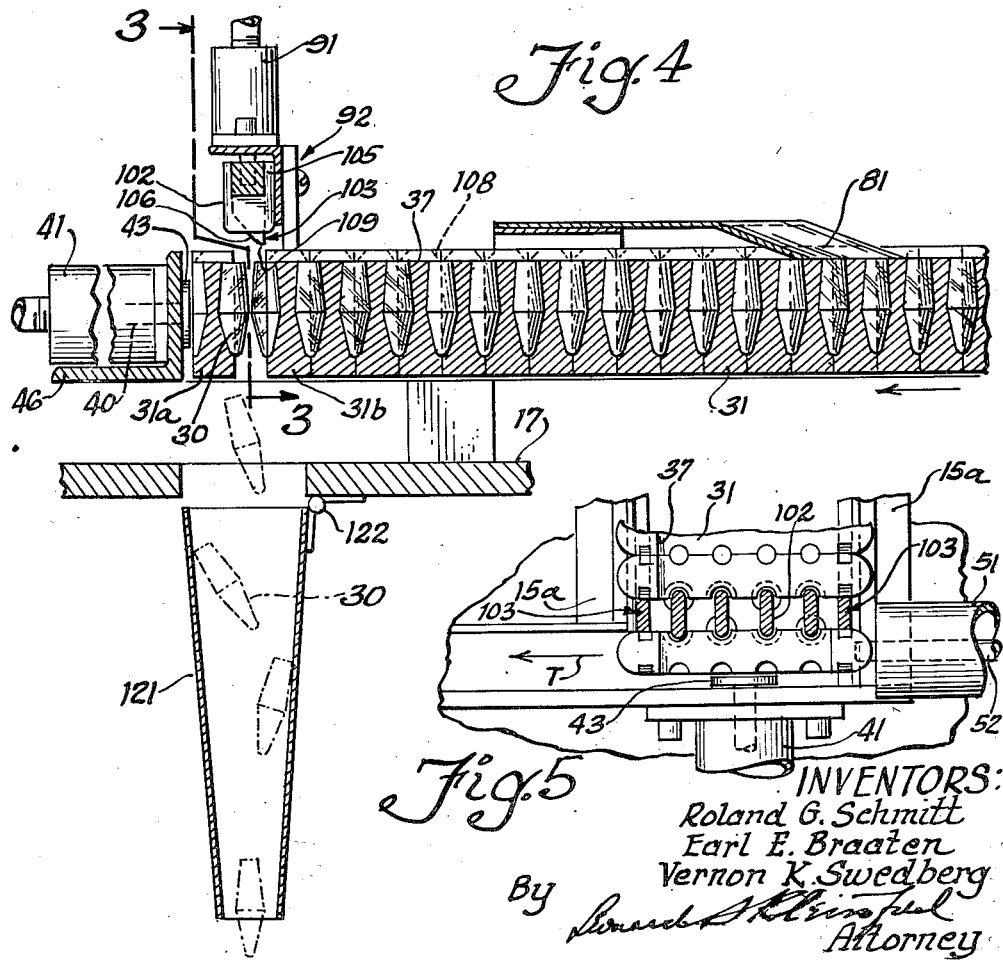
INVENTORS:
Roland G. Schmitt
Earl E. Braaten
Vernon K. Swedberg
By
Attorney Feb. 12, 1957   R. G. SCHMITT ET AL   2,780,832
MACHINE FOR MAKING SUPPOSITORIES OR THE LIKE
Filed Aug. 31, 1953   3 Sheets-Sheet 3
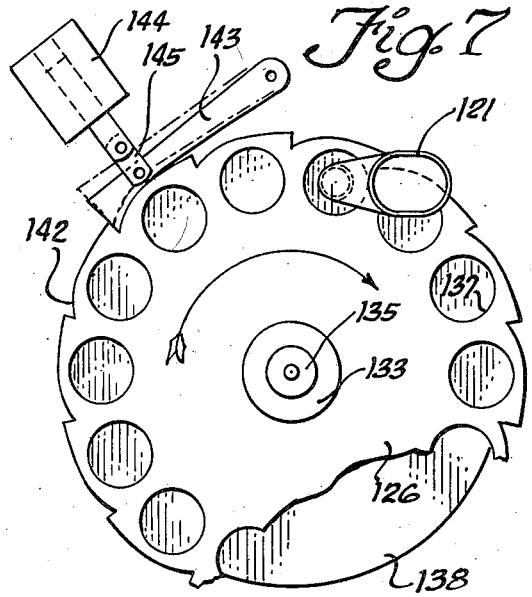
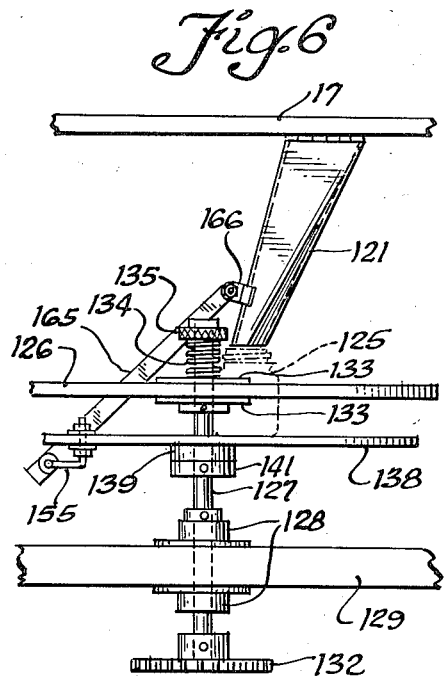
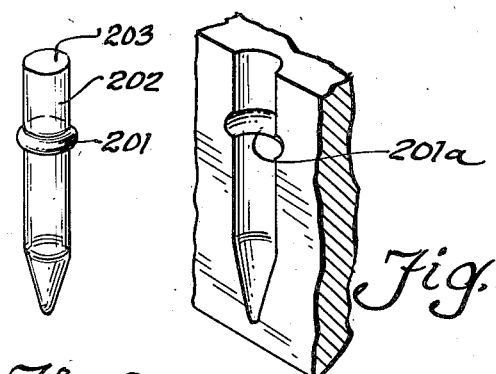
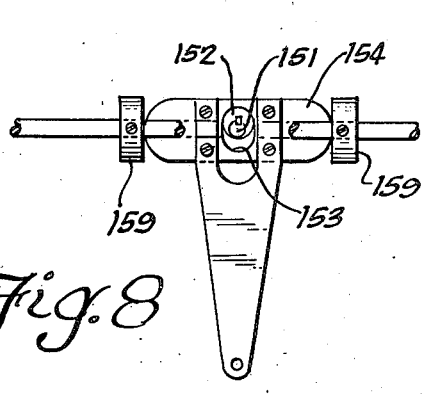
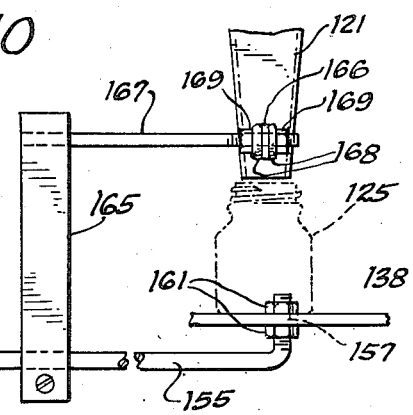
INVENTORS:
Roland G. Schmitt
Earl E. Braaten
Vernon K. Swedberg
By Leonard S. Chenfield
Attorney United States Patent Office 2,780,832
Patented Feb. 12, 1957

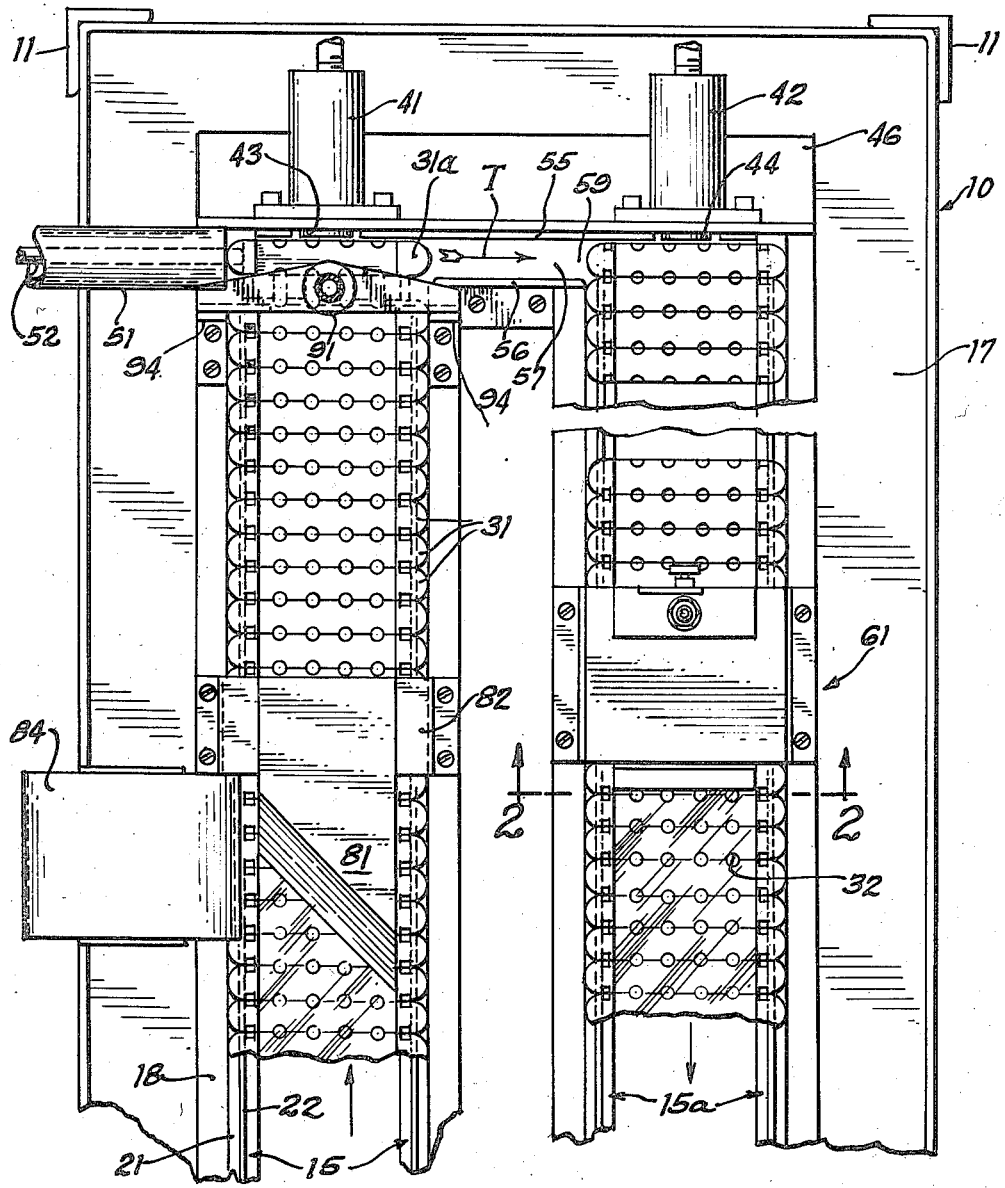

2,780,832

MACHINE FOR MAKING SUPPOSITORIES OR THE LIKE

Roland G. Schmitt, Earl E. Braaten, and Vernon K. Swedberg, Chicago, Ill., assignors to Walgreen Co., Chicago, Ill., a corporation of Illinois Application August 31, 1953, Serial No. 377,432

3 Claims. (Cl. 18—4)

This invention relates to a machine for molding suppositories or similar oleaginous, viscid articles, particularly a rectal suppository, and to one form of such article produced by the machine. Although, for convenience, the invention will be described in connection with a rectal suppository comprising glycerine, water and sodium stearate, it will become apparent that the same is applicable also to the molding of other articles whether or not oleaginous in character. On the other hand certain features of the machine to be disclosed are necessitated principally by the viscid character which some products may possess which causes them to agglutinate together or adhere tenaciously to surfaces with which they may be in contact.

By reason of their ultimate function rectal suppositories are primarily of oleaginous, reasonably rigid material easily softened by body temperature, in order that the object may be easily stored under average conditions of temperature and humidity without losing its proper shape, thereafter inserted without undue difficulty and ultimately reduced to a semi-liquid state to facilitate defecation.

However, these desiderata, when combined with the requirement of economical manufacture, present many problems. For example, the ejection of the hardened product from the molds is attended by particular difficulty due to the viscid character of the object and the need for stripping the object from the mold by applying sufficient force thereto. If the material is to be soft enough to provide a usable article then it will not be sufficiently rigid to receive any arbitrarily selected stripping force without deformation, whereas if the object is made rigid enough to resist such selected stripping force it will be unsuitable for its intended function. The choice between these alternatives presents a difficult problem which, in one aspect, has been solved in the instant invention by providing a novel feature in the suppository whereby stripping thereof from the mold may be performed without change in presently recognized suppository formulae or the hazard of deforming the product.

Accordingly, one of the principal objects of the invention resides in a design of mold for receiving heated fluid material which thereafter, during cooling, hardens into a finished suppository, and which permits stripping therefrom of the finished product without fouling of the mold, stripper or appurtenant parts of the machine.

Another object lies in achieving the foregoing desideration without altering the accepted shape of the suppository to a degree which renders its ultimate employment difficult or unsatisfactory.

A further object resides in providing a suppository molding machine which affords continuous operation, with each stage of the cycle being overlapped with the following stage.

Another object is to provide a machine so arranged that the molds may be interchanged substantially instantaneously without the use of tools or the need for disturbing other parts whereby various configurations of article may be produced on the one machine.

Still another object is to provide a machine including novel means for delivering the finished suppositories in measured quantities to the container in which they are sold.

A further object lies in the provision of means forming part of the packaging means aforesaid specifically designed for facilitating the handling of the viscid articles.

An additional object lies in providing a novel form of die for molding an alternative shape of suppository including a feature to facilitate stripping of this form of article from the mold.

Other objects will appear from the following description which, taken in relation to the appended drawings, will disclose certain modes of carrying the invention into practice.

In these drawings:

Fig. 1 shows a fragmentary top plan view of the machine;

Fig. 2 is a cross-section taken on the line 2—2 of Fig. 1 to show the mold-charging station;

Fig. 3 shows a cross-section transversely of the line of travel of the molds to show the stripping station;

Fig. 4 is a cross-section taken in the plane represented by the line 4—4 of Fig. 3;

Fig. 5 is a cross-section taken on the line 5—5 of Fig. 3;

Fig. 6 is a detail elevational view to show the container-filling mechanism;

Fig. 7 is a top plan view of the mechanism of Fig. 6;

Fig. 8 is a detailed showing in elevation to illustrate further details of the mechanism of Fig. 6;

Fig. 9 is a detail of an alternative form of suppository for the manufacture of which the invention machine is ideally suited; and Fig. 10 is a detail in perspective of one half of a mold for forming the article of Fig. 9.

In its broad aspect the invention comprehends a machine having a plurality of vertically subdivided molds providing cavities which, when paired, constitute a space for receiving the suppository material in a fluid state and which material, when cooled, hardens and may be stripped from the molds. Due to the shape of the suppositories and their viscid character the mold parts are separated just prior to, but substantially concurrently with the stripping action; and means are provided for effecting these actions jointly. Means are included for traversing the molds, of which there is preferably a large plurality along two sets of guideways, one on each side of the machine, past a pair of charging stations one associated with each set of guideways, past mold-separating and stripping stations, also in duplicate, the stripped mold parts arriving at one end of the line then being shifted to the opposite line for utilization there and subsequent transfer to the first line, and so on, repeated cyclically. Means are provided for transferring the stripped mold parts from one set of guideways to the other rapidly and without rebound. The guideways upon which the molds are carried and the molds proper are so constructed as to permit the instantaneous withdrawal of the molds and the substitution of a set having differently-shaped cavities. After being stripped the suppositories pass through a chute to a waiting jar which, after receiving the desired quantity of articles, is shifted and an empty jar brought into position. Novel means are provided for indexing the jars with reference to the mouth of the chute and are combined with means for vibrating the chute and jars to insure that the articles pass well into the jar notwithstanding their sticky character.

In another aspect the invention contemplates the provision of a novel mold for suppositories which are so configured that their tendency to adhere to the mold is amplified, of a feature which facilitates separation of the article from the mold during the stripping operation.

Turning to Figs. 1 to 5 there is shown a framework 10 including legs 11 for supporting the machine on the floor. Two sets of guideways, each including rails 15—15 and 15a—15a are suitably rigidly supported, as by screws 16, on a table top 17. At this juncture it is to be noted that the machine operates in duplicate and, for convenience, the several parts of one of the two lines, both of which extend longitudinally of the machine, will be referred to by the customary reference numerals whereas the corresponding parts of the other line will be accompanied by the same numerals and a suffix "a."

The rails 15—15 and 15a—15a are generally of inverted T-section including a base 18, a stem 19 and a flange 21, the opposed ones of which confront one another for a purpose to appear. Preferably a longitudinally extended bead 22 is provided for minimizing friction as the mold parts to be described are slidably moved upon the rails. Each of the inner rails is terminated in the manner best seen in Fig. 1 to permit the mold parts to be transferred from one line to the other in a manner to be explained.

Arranged to be slidably transversed along the rails is the plurality of mold halves or sections having symmetry about a central mid-plane, i. e. transversely of the direction of travel. Each face of a section is provided with a plurality of cavities 32, in this case four in number, and conformed to one-half of a suppository to be molded, e. g. 30. In the principal embodiment the cavities 32 consist of two substantially frusto-conical portions base-to-base, although it will be understood that insofar as concerns the invention in its primary aspect the configuration of the suppository is capable of wide variation. However, it will be noted that the number of cavities per mold is preferably a sub-multiple of twelve since, in packaging such articles for the trade, a jar of one dozen is regarded as standard. The confronting faces of a pair of adjacent mold halves are ground true in order that the pair may be abutted with no appreciable opportunity for the fluid material to escape from the cavities thereof, and thus to insure a minimum of flash.

Each section 31 is also provided with a pair of oppositely extending ears 33—33 which rest on the beads 22 and support the section in a predetermined path in the horizontal sense, and insure accurate alignment vertically of the mold cavities. For assuring lateral alignment lugs 34 are provided and are arranged to fit reasonably snugly, i. e. without drag, between the stems 19 of the pair of rails. By reason of the aligning means just pointed out the need for dowels in the faces of the mold parts, and the friction attendant on their use, are eliminated. Thus, separation of the mold halves prior to stripping is greatly simplified, and the inevitable problems of cocking which complicate dowel-fitted mold parts are completely avoided. It will be observed that, regarded longitudinally of the rails, the lugs 34 may be made relatively thin and that therefore removal of a mold section may be easily effected by twisting the same slightly on a vertical axis, and lifting it. The slight clearance between the lugs 34—34 and the rails necessary to permit the withdrawal of a die is substantially the same amount as would be required to minimize the drag between the lugs and rails.

Each mold part is centrally recessed over its upper face, as at 37, in order that the plurality of abutted parts may jointly form a channel for confining the fluid material as it is delivered from the source of supply, and in a manner to be described.

The mechanism for intermittently shifting the mold halves along the rails will now be detailed. In this connection it must be recalled that the machine is of duplicate capacity, and that the parts and functions ascribed to one half of the unit will be duplicated symmetrically in the other half. For example, in Fig. 1, the organization seen at the upper part of the figure must be regarded as duplicated below, but for convenience and enlarged scale the lower part has been omitted. A similar observation must be made for other views, and will become more apparent as this description proceeds. However, Figs. 3 and 5 do show portions of the lower right hand section of the machine which is omitted in Fig. 1.

At both ends of a line of molds pneumatic cylinders 41 and 42 is provided, and each includes a piston (not shown) to the rod 40 of which a pusher plate 43 or 44 is attached. The cylinders are supported in any convenient manner, e. g. on an angle iron 46, and are fed air (by means not shown) at the required intervals and under the control of any convenient timing means not forming a part of the invention per se.

Supported in any suitable way on the frame are the transfer cylinders 51—51, each having a piston (not shown) and piston rods 52—52, the free end of this latter being arranged, when actuated, to abut the outer one of the lugs 34 to transfer a mold half 31 from the path in which it has travelled to the opposite path, and as indicated by the arrows T. Strips 55 and 56 define a guideway 57 forming part of the transfer route.

Thus, assuming the parts of the left hand side of the machine (Fig. 1) as shown, and that time in the cycle whereat a selected mold section 31a is to be transferred, the pusher plate 43 will be retracted and the rod 52 is about to be extended. Accordingly, admission of air behind the piston of the cylinder 51 will move the part 31a to the right. However, just prior to that event the pusher plate 44 has been operated to move the whole row of mold sections in the right hand row at least a distance equivalent to the thickness of a section and has been immediately retracted to provide a space into which part 31a may now be shifted.

Proper lateral alignment of the mold section is achieved by the continuation of the right hand rail 15a to the support 46, whereas the left hand rail 15a is foreshortened to about the inner face of the guide 56 to define a getaway 59 through which the mold part 31a may enter. For convenience of further description herein the thickness of a mold section will be defined as the "pitch distance" or simply "pitch."

Following transfer of part 31a to the right the rod 52 is retracted, and a corresponding operation is effected at the opposite end of the machine. It will be noted that movement of a section from its position adjacent a companion part and into its end most position preparatory to transfer is effected by mold-separating means shortly to be detailed. In general it is to be noted that the timing mechanism is so arranged that during a transfer step the two pusher plates 43 and 44 at a selected end of the machine are retracted in order that no interference therewith may result.

Charging of the molds is performed at a station such as that indicated at 61 (Figs. 1 and 2) and broadly includes a supply pipe 62, an electric heater 63 and a spout 64 positioned just above and substantially coextensive transversely with the recess 37. It will be understood that suppositories comprise principally glycerine and a hardening agent and are so constituted as to soften substantially at body temperature. At higher temperatures the material may be rendered relatively fluid and, as long as heat is supplied, the same may be handled without the need for pressure. Accordingly, the material is delivered from a supply tank (not shown) through the conduit 62 and flow control valve 66 to the spout 64, while the parts are maintained at a temperature best suited for charging of the molds by gravity alone by means of the heater 63. Actually we have found it expedient to provide an excess of material which, after filling the molds, may substantially fill the recess 37, and then, after the material has hardened by exposure to normal room temperature, to trim the excess flush with the floor of the recess.

To this end we provide a doctor blade 81 supported on a bridge 82, in turn fastened to the rails 15—15 and 15a—15a. It will be understood that, due to the fragmentary character of Fig. 1, only one of the doctor blades 81 is shown. Preferably the working edge of the blade intersects the line of travel of the molds at an angle of approximately 45° thus to shear the now hardened overflow lying in the recess 37 with minimum effort, and to cause the sheared-off waste to curl upwardly and to leave the blade 81 at right angles to the path of travel of the molds. Accordingly, the excess so trimmed off is delivered to the side of the machine as a continuous ribbon, and may be later melted and re-used. To facilitate departure of the shaved ribbon a curved guide 84, in the form of a semi-cylinder, may be provided in the position shown in Fig. 1. It will be noted that the working edge of the blade 81 is suitably ground to fit closely against the floor of the recess 37 in order to sever the excess cleanly from the material in the molds, and the rake angle is such as to insure easy delivery of the sheared ribbon over the blade and to the side of the machine.

The mold separating and stripping mechanism will now be detailed. Referring to Figs. 1, 3, 4, and 5 a pneumatic cylinder 91 is mounted on a bridge 92 by means of screws 93—93, this bridge including posts 94—94 and a transverse member 95. Secured to the piston 97 of the cylinder 91 is a cross head 101 to which is secured a plurality of plungers 102 and a pair of endwise mold-separating fingers 103.

Each finger 103 is rectangular in horizontal cross section and is provided with a preferably perpendicular rear face 105 and an inclined front face 106. Each mold section 31 is notched as at 108, both the floor of the notch and the face 106 having an angle of approximately 45° whereby downward thrust of the cross head 101 will cause the relatively sharp tip 109 of the fingers 103 to enter a pair of notches 108 to separate a mold section 31 from the next following section. At the moment of separation the plate 43 is retracted and the section 31a may, upon withdrawal of the fingers 103, be shifted to the position in which it is shown.

Due to the viscous character of the molded product some or all thereof may cling to one or the other of the mold sections in which they have been formed, e. g. 31a and 31b. Accordingly, the stripping plungers 102 are provided with an active face extending substantially from wall to wall of the cavities 32 (Fig. 5), i. e. this face is of such dimensions and configuration as to insure abutment against all of the suppositories, whether they are adherent to one mold section or its opposite counterpart. Therefore, upon admission of air to the cylinder 91 the plungers 102 are actuated downwardly to dislodge the suppositories 30 and cause them to fall into a chute 121. This latter is suspended from the underside of the table 17 by a hinge 122 having a loose pin whereby the chute may be subjected to a vibratory action for a reason to appear shortly.

Following stripping of the articles individual to a pair of mold parts such as 31a and 31b the section 31a is transferred to the opposite row in the manner heretofore described, the row of mold sections on each half of the machine is advanced the distance of one pitch, and the cycle is repeated. It will be understood, however, that, prior to actuation of a pusher plate 44, the cross head 101 has been retracted in preparation for a succeeding stroke.

The mouth of each of the chutes 121—121 (there being one for each half of the machine and symmetrically arranged, as explained), is arranged to discharge the suppositories into a waiting jar 125 or other container. Assuming that one dozen units are packed to a jar, and each stripping operation discharges four units, the packaging mechanism is arranged to hold the jar in loading position for the time of three stripping operations, whereupon an empty jar is brought into position. Moreover, due to the viscid character of the product, the same must be subjected to some degree of a mild agitation in its passage through the chute and during filling of the jar. Such results are effected by means now to be brought out.

Referring to Figs. 6, 7, and 8 there is provided a disc 126 of fiber or other material incapable, when the jars are agitated, of breaking the same. The disc 126 is supported on a spindle 127, this latter being journalled in bearings 128—128 fastened to a bracket 129 and carrying a sprocket 132 by means of which the spindle is constantly rotated. The driving chain and source of power, being conventional, are omitted. Positioned against each face of the disc 126 is a pair of friction plates 133—133 keyed to the spindle 127 and pressed into contact with the disc for frictional driving thereof by a compression spring 134. Pressure is controlled by a knurled nut 135, all as is common in the art.

The marginal area of the disc 126 is perforated by a plurality of holes 137 having their centers on a circle concentric with the spindle 127 into each of which a jar 125 is received and positioned vertically by reason of a second disc 138 having some clearance radially with respect to the spindle 127, and supported by means of a felt washer 139 and collar 141.

Indexing of the disc 126 to position the jars consecutively beneath the chute 121 is accomplished by providing a plurality of notches 142 in the periphery thereof and a latch 143 actuated by a plunger-type solenoid 144 and connecting link 145. Inasmuch as the disc 126 is subjected to a constant torque momentary energization of the solenoid 144 will release the latch 143 to free the disc for rotation whereupon the latch, having been returned to its full line position by de-energization of the solenoid may engage the succeeding notch 142 and maintain the jar 125, thus brought into position, stationary pending filling thereof. Suitable timing means and a switch synchronized with the means for advancing the mold sections are provided for control of the solenoid.

In order to overcome the problems incident upon packaging of the viscid product vibratory movement is imparted to the chute 121 and to the jars 125 by means of the arrangement shown in Figs. 6 and 8. A rotary shaft 151 is driven by any convenient source, and an eccentric 152 keyed thereto is arranged within a slot 153 in a plate 154. A rod 155 extends longitudinally of the machine and is bent upwardly at its ends and passed through an aperture 157 in each disc 138, it being understood that the arrangement of Figs. 6 and 7 is duplicated. Rod 155 carries two collars 159—159 in abutment with plate 154. Consequently lateral reciprocating movement of the plate under control of the cam 152 will oscillate the rod 155 and discs 138. By providing lost motion connections as at the nuts 161—161 and in the central aperture of the disc 138 and a rod 155 of sufficient flexibility or "whip," the oscillation of the rod is translated into a vibratory movement of the disc 138 in three dimensions. Thus, the jars 125 are effectively joggled at a desired rate to shake the contents being delivered thereto to a position well below the mouth of the jar, and to cause optimum distribution of the suppositories within the assigned volume.

Projecting from the rod 155 is a pair of arms 165 (one being shown in Fig. 8) each of which is connected to an ear 166 secured to the chute 121 by means of a strut 167. Rubber washers 168—168 and nuts 169—169 complete the desired loose connection. Thus the oscillatory motion, i. e. "whip," of the rod 155 is transmitted also to the chute 121 to insure unobstructed passage of the articles therethrough.

In connection with the foregoing description a form of adult's suppository having a doubly-inclined surface was disclosed exemplificatively, and it became apparent that stripping of the suppositories was thereby facilitated since endwise thrust on a suppository caused the lower conical portion to act in a camming manner to draw the object away from the wall of the mold cavity in a direction substantially perpendicularly thereto. However, children's suppositories are most often in the form of an elongated cylinder having a substantially conical or conoidal nose. Due to the extended straight cylindrical portion of the article of this configuration stripping of the same presents difficulties, since the tendency of the suppository to adhere to the wall of the mold cavity is increased in direct proportion to the area in contact. Bearing in mind the generally yieldable character of the suppository material, excessive end thrust cannot be tolerated. Accordingly, application of such thrust must be sufficiently restrained to avoid deforming the article while being of such degree as to secure dislodgement of the same from the mold.

We have found that the stripping action is greatly facilitated by providing a peripheral bead adjacent the blunt end of the suppository, e. g. the bead 201 on the suppository 202 (Fig. 9). Such bead is preferably semi-circular in transverse cross section. This construction in turn requires a correspondingly formed mold cavity (Fig. 10). By reason of the foregoing end thrust applied on the face 203 is translated into radial movement of the suppository and consequently practically instantaneous detachment of the suppository from the wall of the cavity. In effect the bead 201, in leaving its corresponding mold cavity portion 201a, cams the article substantially perpendicularly to the wall of the cavity.

The production rate of the machine has been considerably facilitated by providing a blower arrangement (not shown) for cooling the mold sections immediately following stripping thereof and prior to re-charging.

From the preceding description it will have become apparent that the invention machine is ideally adapted to its intended purpose; namely, formation of glycerine-type suppositories and analogous articles and the packaging thereof in measured quantities at a high rate of production. At no stage is the product touched by human hands and therefore any possibility of the contamination otherwise possible is eliminated. The design and assembly of the mold sections is such that removal thereof for interchange of one set for another may be accomplished virtually instantaneously and without the use of tools or, in the event of fouling, single sections may be readily withdrawn for cleaning. Advancement of the mold sections from one station to another is accomplished by simple means which are pneumatically operated. Consequently misbehavior of the mold sections, such as may lead to jamming in their normal traverse, will be reflected as excess air pressure which may be readily accommodated by a simple relief valve.

In the appended claims in referring to the substance with which the mold cavities are charged, when we employ the term "fluid" it is not intended that the same be construed as equivalent to "liquid" since the material may be granular or of other particulate character when poured into the cavities and may thereafter be fused by heat or other agent into a homogeneous product. Insofar as concerns the principles of the invention, the particular nature of the material to be molded is of secondary importance except that, having been molded, it is assumed to have the characteristics of a conventional glycerin suppository.

While we have shown particular embodiments of our invention, it will be understood, of course, that we do not wish to be limited thereto since many modifications may be made, and we therefore contemplate by the appended claims to cover any such modifications as fall within the true spirit and scope of our invention.

We claim:

1. A machine for molding a suppository or the like in which a viscid substance is poured into a mold comprising a plurality of identical mold sections of substantially parallelepipedic configuration and having one pair of parallel faces arranged normally for juxtaposition with adjacent sections face-to-face, each of said faces having one-half of a complete mold cavity therein, the plane of the juxtaposed faces representing the parting line of the mold, a pair of ears each extending from an opposite side of each section in the direction of said plane, a pair of fixed guideways for receiving said ears to support said mold sections for translational movement, a mold-filling station, mold-separating and stripping means, means for advancing said molds as a group past said filling station and to said separating and stripping means, each said section having a marginal recess, said mold-separating and stripping means including a reciprocating member having a camming element for insertion into said recess and between a pair of mold sections to separate them by a distance at least equal to the maximum diameter of the suppository, and a finger extended in the direction of advance arranged to enter the two parts of the cavity to eject the product therefrom irrespective of its adhesion to one or the other halves thereof.

2. A machine for molding a suppository or the like in which a viscid substance is poured into a mold and therein solidifies, the combination comprising a plurality of mold sections having at least two parallel faces, means for supporting and guiding said sections for joint movement with opposed parallel faces of adjacent mold sections normally in juxtaposition, each said face having one part of a mold cavity therein, the respective parts together providing a complete mold cavity and the plane abutment of said faces representing the parting line of the mold, a guideway for supporting said sections for translational movement with the cavity parts in operative register, a mold-filling station, means for advancing the molds singly and consecutively along said supporting and guiding means and past said station, means for supplying the substance to the molds as they are moved seriatim past said station, each of said faces having a notch, mold-separating means including a wedge-shaped element for entry into said notch and between said faces for separating a juxtaposed pair of mold sections by a distance at least equal to the maximum diameter of the suppository, to expose the molded product and stripping means having an end finger extended in the direction of advance for ejecting the product from the mold cavity.

3. A machine for molding a suppository or the like in which a viscid substance is poured into a mold comprising a pouring station, a mold-stripping station, a plurality of abutable mold sections having a pair of parallel faces each having a part of a mold cavity therein, and said cavity parts of adjacent sections when placed normally in juxtaposition constituting a complete mold cavity, guideways for supporting said sections with the cavity parts juxtaposed, means for moving said mold sections from said pouring station to said stripping station, single means actuatable as a unit toward the mold section located at said stripping station for separating the abutted mold sections and ejecting the molded product therefrom, said stripping means including a member reciprocatable in a direction transverse to the direction of advance for ejecting the suppository from the mold, said member including a camming element adapted to enter between and to separate a pair of abutted mold sections by a distance at least equal to the maximum diameter of the suppository and a finger extended at its end in the direction of advance so as to move within both parts of a mold cavity to strip the same notwithstanding adhesion of the product to one or the other of the mold parts.

References Cited in the file of this patent

UNITED STATES PATENTS

| | | |
|---|---|---|
| 768,244 | Stokes | Aug. 23, 1904 |
| 803,057 | Held | Oct. 31, 1905 |
| 871,261 | Endemann | Nov. 19, 1907 |
| 1,261,493 | Daniel | Apr. 2, 1918 |
| 1,762,836 | Sherner | June 10, 1930 |
| 2,444,155 | De Back | June 29, 1948 |
| 2,486,388 | Brinton | Nov. 1, 1949 |
| 2,586,822 | Honeyman et al. | Feb. 26, 1952 |
| 2,644,629 | Velie | July 7, 1953 |